April 7, 1942.                H. KLEMPERER                  2,278,431
                        CONDENSER WELDING SYSTEM
                Filed Feb. 5, 1940              2 Sheets-Sheet 1

INVENTOR
HANS KLEMPERER,
BY Elmer J. Gorn
     ATTY.

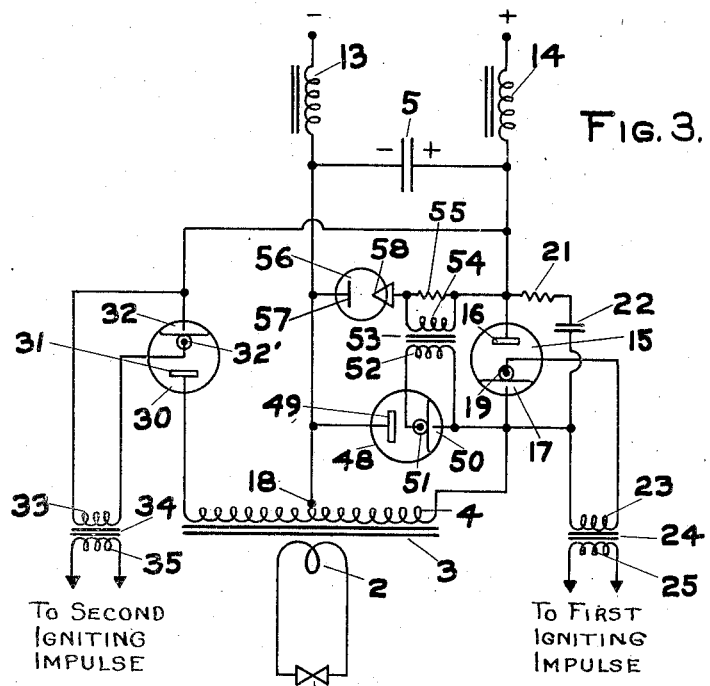
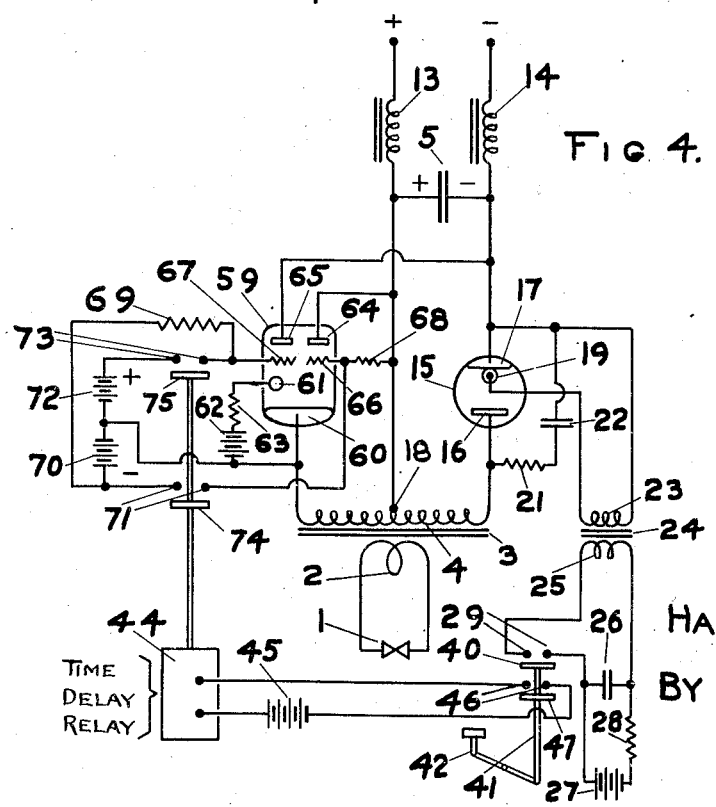

Patented Apr. 7, 1942

2,278,431

UNITED STATES PATENT OFFICE 2,278,431

CONDENSER WELDING SYSTEM

Hans Klemperer, Belmont, Mass., assignor to Raytheon Manufacturing Company, Newton, Mass., a corporation of Delaware Application February 5, 1940, Serial No. 317,360

18 Claims. (Cl. 219—4)

This invention relates to welding systems in which electrical energy is stored in a condenser, and then discharged into a welding load circuit in order to deliver welding current to a resistance welding load. Various systems of this type have been devised in which the condenser discharge delivers a substantially unidirectional pulse of current to the welding load, as described in the copending applications of John W. Dawson, Serial No. 309,124, filed December 14, 1939, for an improvement in Condenser welding systems, and Hans Klemperer, Serial No. 316,798, filed February 1, 1940. In systems of this kind there is often a relatively long period of decay of the current. It is often desirable for various purposes to stop the current flow in the welding load in a shortened period of time. Under these conditions some energy is still stored in the load circuit. In order to increase the efficiency, it is desirable to conserve this energy.

An object of this invention is to terminate the decay current in systems of the above type at any desired time.

Another object is to conserve the energy stored in the load circuit at the time of such termination by restoring that energy to the condenser in such a direction as to be available for delivery to the load in a subsequent welding operation.

A further object is to accomplish the foregoing in a simple and reliable manner.

The foregoing and other objects of this invention will be best understood from the following description of exemplifications thereof, reference being had to the accompanying drawings, wherein:

Fig. 3 is a diagram illustrating another embodiment of my invention; and

Fig. 4 is a diagram illustrating a still further modification of the present invention.

Figure 1:
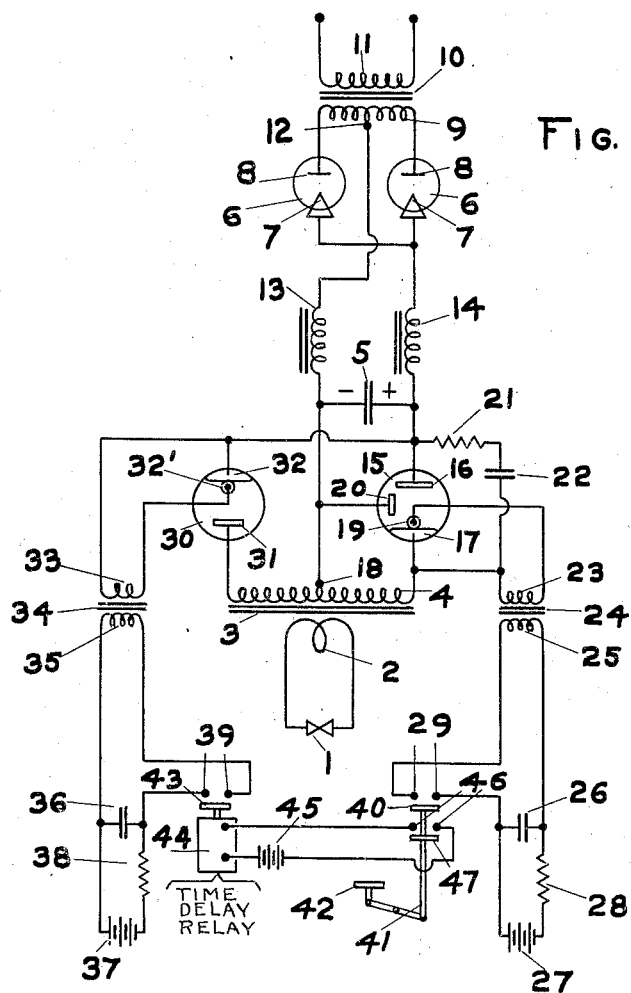
Fig. 1 is a diagram of a condenser welding system embodying my invention.

In the arrangement shown in Fig. 1, welding current is to be supplied to a resistance welding load 1 from the secondary winding 2 of a welding transformer 3 provided with a primary winding 4. The energy necessary to accomplish welding is adapted to be supplied to the primary winding 4 from a condenser 5. This condenser is adapted to be charged from any suitable source of direct current, such as a direct current generator, battery, rectifier, or the like. In Fig. 1 the direct current shown is being supplied from a pair of rectifier tubes 6. These tubes may be of the gas or vapor-filled type having permanently-energized cathodes 7. These cathodes may be thermionic filaments or any other suitable type of cathode. The rectifier tubes 6 are provided with anodes 8 which are connected to opposite sides of the secondary winding 9 of a charging transformer 10 whose primary winding 11 is adapted to be connected to a suitable source of alternating current. The secondary winding 9 is provided with a center tap 12 which is connected through an impedance 13, which is preferably an inductance, to the negative side of the condenser 5. The two cathodes 7 are connected together through an impedance 14, which is likewise preferably an inductance, to the positive side of the condenser 5. The impedances 13 and 14 are of a value to maintain a reasonable charging rate for the condenser 5. Thus when the primary winding 11 is energized, charging current is supplied to the condenser 5, which thereupon is charged to a predetermined voltage.

The primary winding 4 of the welding transformer 3 is provided with a tap 18 intermediate the ends thereof. The condenser 5 is adapted to be discharged through the portion of the primary winding 4 between the tap 18 and the right end of said primary winding. For this purpose the negative side of the condenser 5 is connected directly to the tap 18 while the positive side of the condenser 5 is connected to the right end of the primary winding 4 through a controlled ignition discharge tube 15. The tube 15 is preferably of the pool cathode type with an igniter for initiating a cathode spot on the pool in order to cause the tube to conduct current. The tube 15 is provided with an anode 16 connected to the positive side of the condenser 5, and with a pool cathode 17, preferably of mercury, connected to the right end of the primary winding 4. The tube 15 is also provided with an igniter 19. Although this igniter may be of any suitable type, it preferably is of the electrostatic type consisting of a conductor separated and insulated from the cathode by a thin glass layer. In order to supply the igniter 19 with an igniting impulse for initiating the discharge of the condenser 5, a secondary winding 23 of an igniting transformer 24 is connected between the igniter 19 and its associated cathode 17. The igniting transformer 24 is provided with a primary winding 25. This primary winding is adapted to be supplied with a pulse of current for igniting purposes from a condenser 26 which may be suitably charged from a source of direct current, such as a battery 27 in series with a current-limiting resistance 28.

A pair of contacts 29 are interposed between the primary winding 25 and the condenser 26. When the contacts 29 are closed, the condenser 26 discharges through the primary winding, delivering an igniting impulse to the igniter 19. The tube 15 is also provided with an auxiliary anode 20 which is connected to the tap 18. In order to assist the tube 15 in reliable starting, a resistance 21 in series with a condenser 22 is preferably connected between the anode 16 and the cathode 17. The arrangement as set forth above is more fully described and claimed in the copending application of John W. Dawson referred to above.

For the purpose of stopping the decay current at a predetermined time, as will be explained below, an additional controlled ignition tube 30, preferably of the same type as tube 15, is connected between the left end of the primary winding 4 and the positive side of the condenser 5. The tube 30 is provided with an anode 31 connected to the left end of the primary winding 4, and with a pool cathode 32 connected to the positive side of the condenser 5. Tube 30 also is provided with an igniter 32', preferably of the same type as igniter 19. In order to supply the igniter 32' with igniting impulses, the secondary winding 33 of an igniting transformer 34 is connected between the igniter 32' and its associated cathode 32. The igniting transformer 34 is also provided with a primary winding 35 which is adapted to be supplied with a pulse of current for igniting purposes from a condenser 36. This condenser may suitably be charged from a source of direct current, such as a battery 37 in series with a current-limiting resistance 38. Interposed between the primary winding 35 and the condenser 36 is a pair of contacts 39, which when closed cause the condenser 36 to discharge through the primary winding 35 and deliver an igniting impulse to the igniter 32'.

The closing of the contacts 29 is accomplished by means of an armature 40 of a switch 41 actuated by a pushbutton 42. The contacts 39 are adapted to be closed by an armature 43 of a time delay relay 44. The time delay relay is of the type which when supplied with current closes the contacts 39 after a predetermined time. The relay 44 is preferably adjustable in order that predetermined time delay intervals may be selected at will. The relay 44 is adapted to be actuated by current supplied from a suitable source, such as a battery 45. This battery is connected to the relay 44 through a circuit in which is interposed a pair of contacts 46. These contacts are adapted to be closed by an armature 47 likewise carried by the switch 41.

Figure 2:
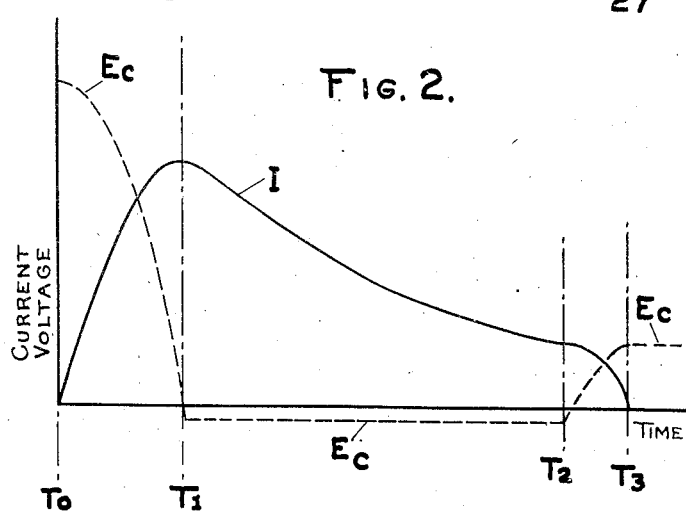
Fig. 2 is a set of curves illustrating the mode of operation of my invention.

The operation of the system described in Fig. 1 may be understood more clearly by referring to the curves shown in Fig. 2. These curves do not purport to show the operation of this system quantitatively, although they do represent in a general qualitative manner the nature of said operation. The solid curve I represents the current delivered from the condenser 5 to the welding load. The dotted curve Ec represents the voltage across the condenser 5. At the time $T_0$, the pushbutton 42 is depressed, closing the contacts 29 and 46. Closure of the contacts 29 ignites the tube 15, and therefore discharge current flows from the condenser between the anode 16 and cathode 17 into the primary winding 4. Therefore this current I rises to a maximum value, while the voltage of said condenser 5, Ec, falls to zero at the time $T_1$. At this time, due to the fact that the voltage Ec thereupon reverses, the anode 20 starts to conduct current. The reversal of voltage at this time also extinguishes current flowing from the anode 16. The inductances 13 and 14 are sufficiently large so that, during the time interval from $T_1$ to $T_2$, the charging current to the condenser 5 is not sufficiently large to again reverse the voltage so as to reinitiate conduction from the anode 16. The discharge path afforded by the anode 20 establishes a relatively low impedance shunt path across the primary winding 4, so that thereupon the current I decays substantially exponentially, as shown in Fig. 2. When the contacts 29 were closed, the contacts 46 were also closed, which action supplied current to the relay 44. Due to the time delay action of said relay, however, the contacts 39 did not close immediately. After a time interval as predetermined by the setting of the relay 44, the armature 43 closes the contacts 39, and thus fires the tube 30. The time of this operation is represented in Fig. 2 at $T_2$. At this point, energy which has been stored in the load circuit, including the transformer 3 and its windings, tends to cause current to flow through said windings in the same direction as previously. This is in a direction to make the anode 31 positive with respect to its cathode 32. Therefore, upon ignition of the tube 30, current flows from the anode 31 to the cathode 32 through the condenser 5 and back to the tap 18. The path for current flow to the condenser 5 thus established is of relatively low impedance, so that the condenser 5 quickly starts to build up a charge, making its left end negative and its right end positive. The voltage Ec at the time $T_2$, therefore, quickly reverses, making the anode 20 negative, and thus extinguishing the arc to said anode. The voltage on the anode 16 does not rise sufficiently rapidly to pick up the discharge, and therefore the arc in the tube 15 is extinguished. This action is assisted by the presence of the condenser 22 which previous to the time $T_2$ had acquired a charge, tending to keep the anode 16 negative. The flow of current to the condenser 5, following the time $T_2$, quickly builds up the voltage across said condenser so that the flow of current stops in a relatively short period of time, terminating at $T_3$. At this time substantially all of the energy which had been stored in the load circuit and transformer at the time $T_2$ has been restored to the condenser 5, and has been delivered to said condenser in the correct polarity so as to be available for the next welding operation. As pointed out above, by making the relay 44 adjustable, the time interval $T_1$—$T_2$ can be set at any predetermined value.

Due to the novel aspects of my invention as incorporated in the foregoing embodiment, welding may be carried on at a relatively rapid rate and with high efficiency. This enables lower sizes of condenser 5 than otherwise might be required. Furthermore, the termination of current flowing in the welding circuit within a predetermined time interval enables the electrodes connected to the work to be opened immediately thereafter without any danger of residual current causing sparks which might pit the surface of the work.

Instead of combining the anodes 16 and 20 into a single tube, the function of these anodes may be assigned to two tubes, whereby the operation may be made still more effective and reliable. Such an arrangement is shown in Fig. 3, in which the same reference numerals are applied where the elements are the same as those shown in Fig. 1. In Fig. 3 the tube 15 is provided only with the anode 16, the function of the auxiliary anode 20 of Fig. 1 being assigned to an additional controlled ignition tube 48, preferably of the same type as tube 15. The tube 48 is provided with an anode 49 connected to the tap 18, and with a pool cathode 50 connected to the right end of primary winding 4. The tube 48 is also provided with an igniter 51 adapted to be supplied with igniting impulses from the secondary winding 52 of an igniting transformer 53, provided with a primary winding 54. The primary winding 54 is connected across a resistance 55 which in turn is connected in series with a rectifier tube 56 across the condenser 5. The rectifier tube 56 may be of small current-carrying capacity, but is one which should withstand the negative voltage applied to the condenser 5. This tube is provided with a permanently-energized type of cathode 58 and an anode 57. The anode 57 is connected to the negative side of the condenser 5 so that when said condenser is initially charged through the inductances 13 and 14, the voltage on the tube 56 is impressed upon it in a non-conducting direction, and therefore said tube does not conduct current. The cathode 58 is connected in series with the resistance 55 to the positive side of the condenser 5.

The operation of the arrangement shown in Fig. 3 may likewise be described in connection with the curves of Fig. 2. This operation is similar to that described in connection with Fig. 1 until the time $T_1$. At this time the reversal of the voltage Ec causes the tube 56 to conduct a pulse of current which delivers an igniting impulse through the igniting transformer 53 to the igniter 51, thus firing the tube 48. Therefore tube 48 conducts current, establishing a relatively low impedance shunt path across the primary winding 4. This extinguishes the tube 15. The current which thereafter flows in said shunt circuit falls exponentially also as indicated in Fig. 2, as more fully described and claimed in said copending Dawson application. Thereafter at the time $T_2$, the tube 30 is fired, as explained in connection with Fig. 1, and the current falls rapidly to zero at the time $T_3$. In Fig. 3 the reversal of the voltage Ec which occurs at the time $T_2$ effectively extinguishes the tube 48, and since the tube 15 has previously been extinguished, the problem of preventing restarting of the arc to the anode 16 is eliminated from the arrangement as shown in Fig. 3.

The tube which produces the exponential decay and the tube which terminates the flow of current can likewise be combined into a single tube, as shown, for example, in Fig. 4. In this figure the same reference numerals are applied where the elements are the same as those shown in Fig. 1. In Fig. 4, however, the polarity of the direct current source is reversed in the interest of simplicity of the system, and the polarity of the connections to the tube 15 likewise is reversed. Thus the anode 16 is connected to the right end of the primary winding 4, and the cathode 17 is connected to the negative side of the condenser 5. The function of the tubes 48 and 30 of Fig. 3 is assigned in Fig. 4 to a single tube 59. This tube is of the controlled type provided with anodes to which the initiation of a discharge is in each case controlled by a suitable grid electrode. The tube 59 is provided with a permanently-energized cathode of any suitable type. For example, this may consist of a mercury pool to which an arc may be started in any well-known manner. This arc is adapted to be maintained by a keep-alive anode 61 supplied from a suitable source of direct current, such as a battery 62 in series with a current-determining resistance 63. The tube 59 is also provided with two anodes 64 and 65, the ignition to which is controlled by the two grids 66 and 67, respectively. The cathode 60 is connected to the left end of primary winding 4, the anode 64 is connected to the positive side of the condenser 5, and the anode 65 is connected to the negative side of the condenser 5. The grid 66 is connected through a resistance 68 to the anode 64. The grid 67 is connected through a resistance 69 and a D. C. potential source 70, such as a battery, to the cathode 60. The battery 70 is polarized so as to maintain the grid 67 negative, and thus prevent the initiation of a discharge to the anode 65. The grid 66, however, being connected to its associated anode 64 becomes positive whenever the anode 64 becomes positive, and thus a discharge can start to said anode whenever such condition occurs. The grid 66 is also adapted to be connected to the negative terminal of the battery 70 through a pair of contacts 71. The grid 67 is also adapted to be connected to the positive terminal of a direct current source, such as a battery 72, through a pair of contacts 73. The contacts 71 and 73 are adapted to be closed by armatures 74 and 75 of the time delay relay 44.

The operation of the system shown in Fig. 4 can likewise be explained in connection with the curves shown in Fig. 2. At the time $T_0$ the pushbutton 42 is depressed, closing the contacts 29 and thus firing the tube 15. The current I thereupon rises to a maximum and the voltage Ec falls to zero at the time $T_1$, as explained in connection with Fig. 1. During this initial pulse of current the voltage to the left of the tap 18 tends to make the cathode 60 positive with respect to the anode 64, and thus said anode does not conduct current. At the time $T_1$, however, the voltage across 4 reverses as well as the voltage across the condenser 5. Thus the anode 64 tends to become positive with respect to its cathode, and starts to conduct current. This in effect establishes a low impedance shunt path across the primary winding 4 which extinguishes the discharge in the tube 15 and allows the current I to decrease exponentially. At the time $T_2$ the time delay relay 44 comes into action, and closes the contacts 71 and 73. This impresses a positive voltage on the grid 67 which causes the anode 65 to conduct current. This conduction of current extinguishes the discharge to the anode 64, as explained in Fig. 3 in connection with the anode 49, and causes the energy stored in the load and the transformer to be fed through the anode 65 into the condenser 5 in the proper direction to give said condenser its initial polarity. Thus, as explained above, the current I falls rapidly to zero at the time $T_3$, with the resultant acceleration of the operation and the conservation of energy.

Of course it is to be understood that this invention is not limited to the particular details as described above as many equivalents will suggest themselves to those skilled in the art. It will be seen that in each case the termination of the current flow is accomplished in effect by reversing the polarity of the connections from the primary winding 4 to the condenser 5 so that the stored energy may be delivered to said condenser

What is claimed is:

1. A welding system comprising a condenser, means for charging said condenser with a predetermined polarity, a welding load circuit, means for discharging said condenser into said load circuit with a substantially unidirectional pulse of current, and means for feeding energy stored in said load circuit into said condenser when said pulse of current has fallen to a relatively low value, whereby the decrease of said current pulse is accelerated, said last-named means being connected to feed said energy into said condenser with the same polarity as said charging means.

2. A welding system comprising a condenser, means for charging said condenser with a predetermined polarity, a welding load circuit, means for discharging said condenser into said load circuit with a substantially unidirectional pulse of current, means for feeding energy stored in said load circuit into said condenser, said last-named means being connected to feed said energy into said condenser with the same polarity as said charging means, and means for initiating the operation of said last-named means at a predetermined time interval after the initiation of the operation of said discharging means.

3. A welding system comprising a condenser, means for charging said condenser with a predetermined polarity, a welding transformer having a primary winding and a secondary winding, means for discharging said condenser into said primary winding with a pulse of current, and means for feeding energy stored in said load circuit and said transformer into said condenser when said pulse of current has fallen to a relatively low value, whereby the decrease of said current pulse is accelerated, said last-named means being connected to feed said energy into said condenser with the same polarity as said charging means.

4. A welding system comprising a condenser, means for charging said condenser with a predetermined polarity, a welding transformer having a primary winding and a secondary winding, means for discharging said condenser into said primary winding, means for feeding energy stored in said load circuit and said transformer into said condenser, said last-named means being connected to feed said energy into said condenser with the same polarity as said charging means, and means for initiating the operation of said last-named means at a predetermined time interval after the initiation of the operation of said discharging means.

5. A welding system comprising a condenser, means for charging said condenser with a predetermined polarity, a welding transformer having windings having input and output connections, a welding load circuit connected to said output connections, means for connecting said condenser to said input connections to discharge said condenser into said windings with a substantially unidirectional discharge current, and means for reversing the polarity of the connections of said condenser to said transformer windings when said discharge current has fallen to a relatively low value.

6. A welding system comprising a condenser, means for charging said condenser with a predetermined polarity, a welding load circuit, means for discharging said condenser into said load circuit with a substantially unidirectional pulse of current, and means for reversing the polarity of the connections of said condenser to said load circuit when said discharge current has fallen to a relatively low value.

7. A welding system comprising a condenser, means for charging said condenser with a predetermined polarity, a welding load circuit, means for discharging said condenser into said load circuit with a substantially unidirectional pulse of current, and means for reversing the polarity of the connections of said condenser to said load circuit, and means for initiating the operation of said last-named means at a predetermined time interval after the initiation of the operation of said discharging means.

8. A welding system comprising a condenser, means for charging said condenser with a predetermined polarity, a welding transformer having windings having input and output connections, a welding load circuit connected to said output connections, said windings including two windings connected in series, means for connecting said condenser to said input connections to discharge said condenser into one of said two windings, and means for connecting the other of said two windings to said condenser when the discharge current from said condenser has fallen to a relatively low value.

9. A welding system comprising a condenser, means for charging said condenser with a predetermined polarity, a welding transformer having windings having input and output connections, a welding load circuit connected to said output connections, said windings including two windings connected in series, means for connecting said condenser to said input connections to discharge said condenser into one of said two windings, and means for connecting the other of said two windings to said condenser to feed energy from said other winding into said condenser with the same polarity as said charging means when the discharge current from said condenser has fallen to a relatively low value.

10. A welding system comprising a condenser, means for charging said condenser with a predetermined polarity, a welding transformer having windings having input and output connections, a welding load circuit connected to said output connections, said windings including two windings connected in series, means for connecting said condenser to said input connections to discharge said condenser into one of said two windings, means for connecting the other of said two windings to said condenser, to feed energy from said other winding into said condenser with the same polarity as said charging means, and means for initiating the operation of said last-named means at a predetermined time interval after the initiation of the operation of the first of said connecting means.

11. A welding system comprising a condenser, means for charging said condenser with a predetermined polarity, a welding transformer having windings having input and output connections, a welding load circuit connected to said output connections, said windings including two windings connected in series, means for connecting said condenser to said input connections to discharge said condenser into one of said two windings, means which operates upon substantially complete discharge of said condenser for establishing a relatively low impedance shunt path across the other of said two windings, and means for connecting the other of said two windings to said condenser when the discharge current from said condenser has fallen to a relatively low value.

12. A welding system comprising a condenser, means for charging said condenser with a predetermined polarity, a welding transformer having windings having input and output connections, a welding load circuit connected to said output connections, said windings including two windings connected in series, means for connecting said condenser to said input connections to discharge said condenser into one of said two windings, means which operates upon substantial discharge of said condenser for establishing a relatively low impedance shunt path across the other of said two windings, and means for connecting the other of said two windings to said condenser when the discharge current from said condenser has fallen to a relatively low value.

13. A welding system comprising a condenser, means for charging said condenser with a predetermined polarity, a welding transformer having windings having input and output connections, a welding load circuit connected to said output connections, said windings including two windings connected in series, means for connecting said condenser to said input connections to discharge said condenser into one of said two windings, means which operates upon substantial discharge of said condenser for establishing a relatively low impedance shunt path across the other of said two windings, means for connecting the other of said two windings to said condenser, and means for initiating the operation of said last-named means at a predetermined time interval after the initiation of the operation of the first of said connecting means.

14. A welding system comprising a condenser, means for charging said condenser with a predetermined polarity, a welding transformer having windings having input and output connections, a welding load circuit connected to said output connections, said windings including two windings connected in series, means for connecting said condenser to said input connections to discharge said condenser into one of said two windings, and means which operates upon substantial discharge of said condenser for establishing a relatively low impedance shunt path across the other of said two windings.

15. A welding system comprising a condenser, means for charging said condenser with a predetermined polarity, a welding load circuit, means for discharging said condenser into said load circuit with a pulse of current, means for feeding energy stored in said load circuit into said condenser, said last-named means being connected to feed said energy into said condenser with the same polarity as said charging means, and means for initiating the operation of said last-named means at a predetermined time interval after the initiation of the operation of said discharging means.

16. A welding system comprising a condenser, means for charging said condenser with a predetermined polarity, a welding transformer having windings having input and output connections, a welding load circuit connected to said output connections, means for connecting said condenser to said input connections to discharge said condenser into said windings, and means for reversing the polarity of the connections of said condenser to said transformer windings when the discharge current from said condenser has fallen to a relatively low value.

17. A welding system comprising a condenser, means for charging said condenser with a predetermined polarity, a welding load circuit, means for discharging said condenser into said load circuit with a pulse of current, and means for reversing the polarity of the connections of said condenser to said load circuit when the discharge current from said condenser has fallen to a relatively low value.

18. A welding system comprising a condenser, means for charging said condenser with a predetermined polarity, a welding load circuit, means for discharging said condenser into said load circuit with a pulse of current, means for reversing the polarity of the connections of said condenser to said load circuit, and means for initiating the operation of said last-named means at a predetermined time interval after the initiation of the operation of said discharging means.

HANS KLEMPERER.